United States Patent Office 3,434,800
Patented Mar. 25, 1969

3,434,800
PROCESS FOR DETERMINING MERCURY IN GEOLOGIC MATERIALS
Frederick N. Ward, Denver Colo., assignor to the United States of America as represented by the Secretary of the Interior
No Drawing. Filed May 16, 1966, Ser. No. 551,496
Int. Cl. G01n 31/22
U.S. Cl. 23—230
5 Claims

ABSTRACT OF THE DISCLOSURE

A measured sample of soil or rock is heated to 650–750° C. to drive off any mercury present, and the mercury vapor is absorbed in bromine water. The resultant solution is then employed to catalytically react nitrosobenzene with ferrocyanide to form a purple colored test solution, the color intensity of which is proportional to the amount of mercury present. Standard mercury solutions or a spectrophotometer are then used to determine the amount of mercury in the test solution.

---

This invention relates to an analytical process for determining the presence and amount of mercury in geologic materials.

Mercury is found in combination with other valuable elements in many minerals. Furthermore, apparently as a result of the mercury's relatively high volatility, some of the mercury migrates from and forms halo-like configurations around such mercury-containing minerals in the depths of the earth. Since the discovery that the presence of mercury values in geologic materials such as soil and rock is a clue to the presence of concealed deposits of ores containing other valuable elements such as gold, silver, lead and zinc, there has been considerable interest in the use of mercury as a pathfinder for sources deep in the earth containing these valuable elements. To measure the minute amounts of mercury occurring in the halos around such deposits, very sensitive spectrographic and vapor absorption procedures have been developed. However, both of these procedures require elaborate and expensive instruments, which have tended to reduce the potential usefulness of mercury surveys in geochemical prospecting.

Accordingly, the object of this present invention is to provide a simple process for economically determining the presence of as little as 30 parts per billion of mercury, in elemental or compound form, in a 1-gram sample of geologic material such as soil or rock.

Further objects and advantages will be had from the following description of the process.

The procedure of the present invention is based on the catalytic effect of mercury on the reaction of ferrocyanide with nitrosobenzene to produce a violet colored compound the intensity of which is related to the mercury concentration present. A spectrophotometer or visual comparison of the test solution with saindard solutions of known mercury content can then be used to determine the presence and amount of mercury present.

Initially a small particulate sample of geologic material such as rock or soil is heated to vaporize substantially all the mercury therein and thereby effect the separation of mercury from elements which would otherwise interfere with the subsequent treatment. A temperature ranging from about 650° C. to about 750° C. is adequate for these puropses. Evolved mercury vapors are then trapped in a dilute bromine solution. Although the exact nature of the reaction is not known, it appears that the mercury may be trapped as a mercuric bromide complex. After all the vapors evolved are trapped, the solution is heated to drive off excess bromine and a pH of about 3.2 to about 3.5 is established. Ferrocyanide and nitrosobenzene are then added to the solution and the mixture is heated to cause a reaction between these two compounds, catalyzed by the presence of mercuric ions. As stated previously, a spectrophotometer or standard mercury solutions can then be used to determine the presence and amount of mercury in the purple solution since the optical density of the test solution is proportional to the mercury concentration present therein.

Any bromine solution which supplies bromine as an anion and will not interfere with the subsequent ferrocyanide-nitrosobenzene color-forming reaction can be employed. Sodium bromide and potassium bromide solutions are suitable for the purposes of this invention. A dilute bromine solution efficiently traps the mercury vapors.

The proper solution pH (about 3.2 to about 3.5) necessary for the color-forming reaction can be attained by adding a base such as sodium hydroxide to the mercury-containing bromine solution. However, the addition of a buffer solution to the bromine solution prior to the mercury vapor trapping step more readily obtains the proper pH. Such a buffer solution could also be added after the trapping step, but adding it beforehand is preferable. Any buffer solution which will not interfere with the reaction or cause precipitation of mercury can be employed. Sodium and potassium acetate buffer solutions are suitable.

A specific procedure for the entire process is as follows:

(1) Place 0.1 to 0.5 gram of minus 40 Tyler mesh soil or rock sample into an 18 x 75 mm. test tube; fit on a delivery tube and insert the end of the tube containing the sample into a tube furnace maintained at a temperature of about 650° C.

(2) Heat the sample for 2 minutes and collect evolved vapors in 4 ml. of bromine-buffer reagent contained in a 16 x 150 mm. test tube.

(3) Remove the sample tube from hot furnace; disconnect the delivery tube, and rinse the delivery tube with 1 ml. of bromine-buffer reagent. Add rinse to the collecting reagent.

(4) Place a magnetic stirring bar in the test tube containing collected vapors; insert the tube in an aluminum heating block fitted over a magnetic stirrer and heat the test tube at 95° C. until bromine distillation is complete and solution colorless. Heat an additional 2 minutes. Cool the solution to about 25° C. and remove the magnet.

(5) Add 1 ml. of potassium ferrocyanide and 2 ml. of nitrosobenzene solutions to the contents of the test tube and mix; place the test tube in a water bath at 50° C. for 45 minutes.

(6) Remove the tube from the water bath, cool rapidly, and compare with standard solutions by viewing axially. Alternatively, use a spectrophotometer to measure the absorbence at 528 m$\mu$ and ascertain the mercury content by reference to a previously established standard curve.

PREPARATION OF STANDARD SOLUTIONS

Pipet aliquots of working standard (1 microgram Hg per ml.) into a series of test tubes as follows: none to first tube, 30 microliters to second, 50 microliters to third, 100 to fourth, 200 to fifth, 400 to sixth and 800 microliters to seventh tube. Add 5 ml. of bromine buffer-reagent to each tube and continue with step 4 of procedure.

REAGENTS

All reagents are prepared with demineralized water.

Bromine-buffer reagent: Mix 10 ml. acetate buffer, 5 ml. bromine water saturated at room temperature and 85 ml. water.

Acetate buffer: Dissolve 164 grams of anhydrous sodium acetate or 272 grams of the trihydrate in 1 liter of water. Add glacial acetic acid until the pH is 3.25, as measured by a pH meter.

Ferrocyanide solution: Dissolve 0.422 gram $$K_4Fe(CN)_6$$

in water and dilute to 1 liter.

Nitrosobenzene solution: Dissolve 8 mg. of nitrosobenzene in 90 ml. water at 70° C. (nitrosobenzene melts at 68° C.); cool the solution and add 10 ml. of acetate buffer.

Mercury standard: Dissolve 0.1354 g. of reagent grade mercuric chloride in 100 ml. of 1 N sulfuric acid. This standard contains 1,000 micrograms mercury per ml. Prepare 100 micrograms per ml. and 10 micrograms per ml. standards by dilution with 1 N $H_2SO_4$. These standards are stable for about 3 months at ordinary temperatures. A working standard of 1 microgram per ml. should be prepared fresh every day by diluting the 10 micrograms per ml. standard with water.

INTERFERENCES

During heating of the particulate sample of geologic material, any sulfides present evolve small amounts of hydrogen sulfide, and any organic matter decomposes. The hydrogen sulfide, as well as other decomposition products, decolorizes the bromine water and leads to losses of mercury because of the failure of the collecting solution to retain the mercury vapors. Handling small samples and adding iron filings to the sample mixture help to prevent the evolution of large volumes of hydrogen sulfide and thereby lessen the danger of mercury loss during distillation.

During the complex reaction between ferrocyanide and nitrosobenzene, other undesirable reactions such as oxidation of either of these two compounds compete with the desired purple color-yielding catalytic reaction. A reaction temperature of about 45 to 55° C. and a heating period of about 45–60 minutes yield an optimum degree of the desired catalytic reaction.

If the purple colored test solutions are kept at refrigerator temperatures, the complex formed will remain stable for as long as 90 minutes. At room temperatures the purple complex will remain stable for only about 30 minutes. Sunlight will rapidly fade the color.

The following tables indicate the precision and accuracy of the analytical procedure of the invention.

TABLE 1.—COMPARISON OF CATALYTIC METHOD OF PRESENT INVENTION WITH VAPOR ABSORPTION METHOD

| Material | Mercury content, p.p.m. | |
| --- | --- | --- |
|  | Catalytic method | Vapor absorption method |
| Granite, fresh | 20 | 30 |
| Breccia (latite phonolite) | 70 | 110 |
| Granite, altered | 200 | 290 |
| Breccia (latite phonolite) | 200 | 470 |
| Limestone | 2,000 | 5,090 |
| Flaky shale | 80 | 50 |
| Alluvium | 100 | 150 |
| Weathered shale | 80 | 200 |
| Do | 180 | 300 |
| Shale | 100 | 300 |
| Weathered shale | 520 | 800 |
| Shale | 200 | 450 |

TABLE 2.—REPEATABILITY OF MERCURY DETERMINATIONS EMPLOYING THE PROCESS OF THE PRESENT INVENTION

| Material [1] | Mercury found (p.p.b.) | | Relative standard deviation from the mean (percent) |
| --- | --- | --- | --- |
|  | High | Low |  |
| Flaky shale | 50 | 30 | 21.2 |
| Granite, fresh | 100 | 70 | 15.3 |
| Breccia (latite phonolite) | 100 | 80 | 10.6 |
| Do | 110 | 90 | 10.0 |
| Granite, altered | 130 | 110 | 8.4 |
| Shale | 170 | 160 | 3.5 |
| Limestone | 950 | 860 | 3.5 |

[1] Each material was subjected to 5 separate determinations.

Table 1 shows how the process of the present invention favorably compares with the known vapor absorption method. Lack of homogeneity of the test samples is one factor that contributes to variations in results between the two procedures. The relatively low deviation between determinations on each material tested on table 2, is evidence of the reliability and sensitivity of the process with materials containing minute quantities of mercury.

80 to 100 determinations per man day can be made with the process of the present invention. Reagent costs per determination are minor. Equipment costs are relatively low. The process can also be used to directly measure the mercury content of geological materials other than soils or rocks such as natural waters, galena and sphalerite.

Although the particular process is well adapted to carry out the objects of the present invention, it is to be understood that various modifications and changes may be made all coming within the scope of the following claims.

What is claimed is:

1. A process for determining the presence and amount of mercury in particulate geologic materials comprising:
    (a) heating a measured sample of said geologic material to vaporize substantially all said mercury therein to produce mercury vapor;
    (b) immediately thereafter trapping said mercury vapor in a bromine solution;
    (c) heating said bromine solution in which said vapors have been trapped to drive off excess bromine;
    (d) establishing in said excess bromine-free solution a pH of from about 3.2 to about 3.5;
    (e) adding nitrosobenzene and ferrocyanide to said excess bromine-free solution with said established pH so that any mercuric ion present in the solution will catalytically react the nitrosobenzene with the ferrocyanide to form a purple colored test solution, the color intensity of which is proportional to the amount of mercury present therein;
    (f) employing a spectrophotometer or standard mercury solution containing known amounts of mercury to determine the amount of mercury present in said test solution.

2. The process of claim 1 wherein the geologic sample is heated to a temperature ranging from about 650° C. to about 750° C.

3. The process of claim 1 wherein said pH of about 3.2 to about 3.5 is established by adding a buffer solution to said bromine solution prior to said vapor trapping step.

4. The process of claim 3 wherein said buffer solution is a sodium acetate solution containing glacial acetic acid.

5. The process of claim 4 wherein the catalytic reaction between the ferrocyanide and nitrosobenzene in the solution is carried out at a temperature of from about 45° C. to about 55° C. for a period of time of from about 45 minutes to about 60 minutes.

References Cited

Asperger, S. and I. Murati, Anal. Chem. 26, No. 3, March 1954, pp. 543–545.

Asperger, S. and D. Pavlovic, Anal. Chem. 28, No. 11, November 1956, p. 1761.

MORRIS O. WOLK, Primary Examiner.

R. M. REESE, Assistant Examiner.

U.S. Cl. X.R.

23—232